US006658348B2

(12) United States Patent
Rudd et al.

(10) Patent No.: US 6,658,348 B2
(45) Date of Patent: Dec. 2, 2003

(54) SYSTEMS AND METHODS FOR PROVIDING INFORMATION TO USERS

(75) Inventors: Michael L Rudd, Fort Collins, CO (US); Steven L Webb, Loveland, CO (US); K Douglas Gennetten, Ft Collins, CO (US); Brian J. Brown, Fort Collins, CO (US); Jerlyn R Culp, Fort Collins, CO (US); Michelle R Lehmeier, Loveland, CO (US); James C. Albritton-McDonald, Bellvue, CO (US); Terry H. Hildebrandt, Berthoud, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 137 days.

(21) Appl. No.: 09/974,672

(22) Filed: Oct. 9, 2001

(65) Prior Publication Data

US 2003/0069685 A1 Apr. 10, 2003

(51) Int. Cl.[7] .................................................. G01S 5/02
(52) U.S. Cl. ........................ 701/207; 701/201; 340/988; 342/357.13
(58) Field of Search ................................ 701/207, 211, 701/213, 201, 208, 212; 340/988, 989, 990, 995; 342/357.13, 357.06

(56) References Cited

U.S. PATENT DOCUMENTS

| 6,111,541 A | | 8/2000 | Karmel | |
|---|---|---|---|---|
| 6,249,740 B1 | | 6/2001 | Ito et al. | |
| 6,418,372 B1 | * | 7/2002 | Hofmann | 701/209 |
| 6,433,735 B1 | * | 8/2002 | Bloebaum et al. | 342/357.1 |
| 6,459,989 B1 | * | 10/2002 | Kirkpatrick et al. | 701/215 |
| 6,502,030 B2 | * | 12/2002 | Hilleary | 701/207 |
| 6,510,380 B1 | * | 1/2003 | Curatolo et al. | 701/207 |
| 6,522,267 B2 | * | 2/2003 | Flick | 340/989 |
| 6,526,351 B2 | * | 2/2003 | Whitham | 701/211 |
| 6,526,352 B1 | * | 2/2003 | Breeds | 701/213 |
| 2002/0152028 A1 | * | 10/2002 | Motoyama et al. | 701/213 |

FOREIGN PATENT DOCUMENTS

| DE | 19526494 | 1/1997 |
|---|---|---|
| EP | 1207405 | 5/2002 |
| GB | 2356321 | 5/2001 |
| GB | 2367965 | 4/2002 |

* cited by examiner

Primary Examiner—William A. Cuchlinski, Jr.
Assistant Examiner—Tuan C To

(57) ABSTRACT

Systems for providing information to a user are provided. In this regard, a representative system includes an identification device. The identification device incorporates a locator and a transmitter. The locator is configured to facilitate determining a location of the identification device so that information corresponding to a user of the identification device and information associated with the location of the identification device can be transmitted via the transmitter to a services system. In response to the information provided by the identification device, the services system can provide information to the user via the first identification device based, at least in part, on the location of the identification device. Image-capturing devices also are provided.

6 Claims, 12 Drawing Sheets

SYSTEMS AND METHODS FOR PROVIDING INFORMATION TO USERS

BACKGROUND OF THE INVENTION

1. Field of the Invention

The present invention involves providing information to a user based, at least in part, upon the identification and/or location of the user.

2. Description of the Related Art

Facilities that accommodate large number of users typically encounter common problems. For instance, such facilities oftentimes encounter difficulties relating to providing access to large numbers of users while maintaining crowd levels at reasonable levels. Moreover, even if an appropriate number of users are provided with access to a facility, certain aspects of facility management, such as managing wait-times of attractions of the facility, for example, still can be problematic. Facilities, such as amusement parks, museums, and resorts, for example, are known to encounter these types of problems. Therefore, there is a need for improved systems, devices and/or methods that address these and/or other shortcomings of the prior art.

SUMMARY OF THE INVENTION

Briefly described, the present invention relates to systems, devices and methods for providing information to a user. In this regard, identification service systems are provided. A representative embodiment of an identification service system incorporates an identification device. Such an identification device includes a locator and a transmitter. The locator is configured to facilitate determining a location of the identification device so that information corresponding to a user of the identification device and information associated with the location of the identification device can be transmitted to a services system. In response to the information provided by the identification device, the services system can provide information to the user via the identification device based, at least in part, on the location of the identification device.

Image-capturing devices also are provided. In this regard, a representative embodiment of such an image-capturing device includes a first image-capturing component and a second image-capturing component. The first image-capturing component is configured to capture image data corresponding to a first location and the second image-capturing component, which can be arranged adjacent to the first image-capturing device, is configured to capture image data corresponding to a second location. Preferably, the first and second image-capturing devices are able to simultaneously capture image data corresponding to the first and second locations.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION

Figure 1:
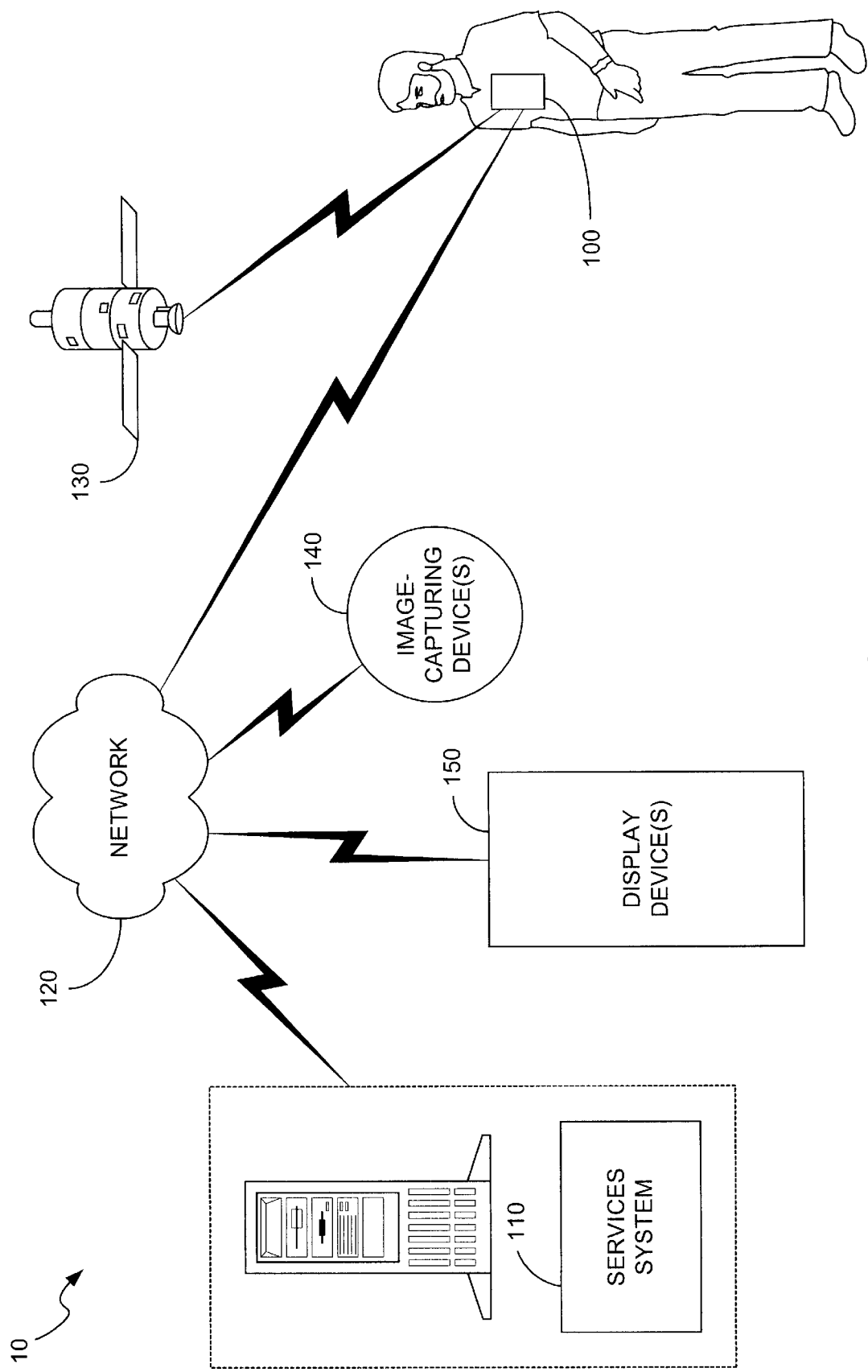
FIG. 1 is a schematic diagram depicting an embodiment of the identification service system of the present invention.

Referring now to the figures, wherein like reference numerals indicate corresponding components throughout the several views, FIG. 1 depicts a representative embodiment of the identification service system 10 of the present invention. As shown in FIG. 1, identification service system 10 includes an identification device 100 that is configured to communicate with a services system 110. As described in greater detail herein, the services system can be adapted to provide various types of information to a user via an identification device 100, for example. For instance, some embodiments can be adapted for use in an amusement park where the services system could provide information about park attractions to a user via the identification device. Additionally, such an embodiment could be used to locate users of various identification devices so that a meeting time/place can be established.

Identification device 100 communicates with the services system via network 120. By way of example, the identification device can communicate with the services system so that the location of the identification device and, thus, the location of a corresponding user of the identification device, can be determined. In some embodiments, information provided by an identification device can include data directly corresponding to the location of the identification device. In other embodiments, the information communicated to the services system merely facilitates determining the location of the identification device. For instance, the identification device can be configured to receive information provided by global positioning system (GPS) satellites, e.g., satellite 130. Alternatively, the identification device could be configured to use any other airborne or land-based system that is capable of facilitating a determination of the identification device's location. Regardless of the particular methodology employed for locating an identification device and/or its user, identification service system 10 preferably provides information to the user based, at least in part, on the user's location.

Network 120 may be any type of communication network employing any network topology, transmission medium, or network protocol. For example, network 120 may be a local area network (LAN), a metropolitan area network (MAN), a wide area network (WAN), any public or private packet-switched or other data network, including the Internet, circuit-switched networks, such as the public switched telephone network (PSTN), wireless networks, or any other desired communications infrastructure.

Embodiments of the identification service system 10 also may include one or more image-capturing devices 140 and one or more display devices 150. The image-capturing devices 140 and display devices 150 are configured to communicate with services system 110. So provided, various embodiments of the identification service system 10 can be adapted to capture images of users of a facility, for example, based at least in part upon information provided to services system 110 via identification device 100. For instance, an image-capturing device, e.g., a digital camera, video camera, etc., could be prompted to capture an image corresponding to the user based upon the user's location, i.e., the location of the identification device associated with the user. Thereafter, the user may be able to view the image via a display device 150. Various other functionality can be provided by the identification service system of the invention and will be described in greater detail hereinafter.

Figure 2:
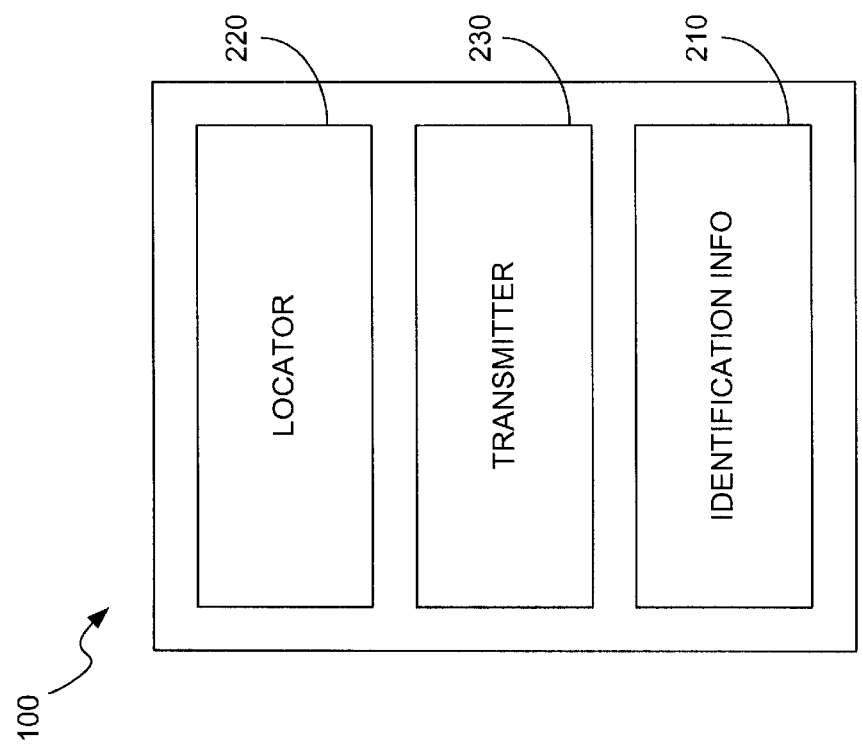
FIG. 2 is a schematic diagram depicting an embodiment of the identification device of FIG. 1.

The block diagram of FIG. 2 depicts a representative identification device 100. As shown in FIG. 2, identification device 100 is configured to maintain identification information 210. Identification information 210 preferably corresponds to a particular user or group of users. Various types of identification information may be used. For instance, user name, physical description, photograph, etc., can be maintained for specifically identifying the user(s) associated with the identification device.

By way of example, if the identification service system is implemented for use at an amusement park, identification information 210 can include information relevant to determining whether a user should be permitted to participate in a particular activity. Such information may include age, height, and weight, among others. These parameters typically are utilized at an amusement park for determining whether a user should be allowed on a particular ride.

When implemented for use at a ski resort, for instance, identification information 210 can include the user's skill level, which might be useful determining whether the user should have access to a slope with a particular difficulty rating. Thus, it should be apparent that the information used and/or maintained by the identification service system can vary depending upon the particular application.

Preferably, identification information 210 stores an identifier that is suitable for being communicated to services system 110 (FIG. 1). In some embodiments, identification information 210 may only include the identifier, with any remaining information pertaining to the user(s) being maintained by another device, such as the services system, for example. The identification information can be provided in one or more of various formats, including photographic, textual, bar code, or any memory type or configuration that is suitable for storage and/or retrieval.

Identification device 100 of FIG. 2 includes a locator 220 that is configured to facilitate locating of the identification device. In some embodiments, locator 220 can be implemented as a GPS receiver. In other embodiments, the locator can be implemented as a component of a tracking system, for example. For instance, in one such tracking system, locator 220 could provide a signal that is configured to enable the identification device to be located. Identification device 100 also incorporates a transmitter 230 that provides information associated with user identification and/or the location of the identification device to services system 100.

Identification devices 100 can be provided in various configurations. For example, an embodiment of the identification device can be configured as a badge that is suitable for a user to wear. One such badge could be attached to the clothing of the user with a clip, for example, or any other component that is able to securely fasten the identification device to the user's clothing. Other embodiments can be provided with lanyards so that the identification device can be retained by the user, such as by placing the lanyard around the user's neck.

Figure 3:
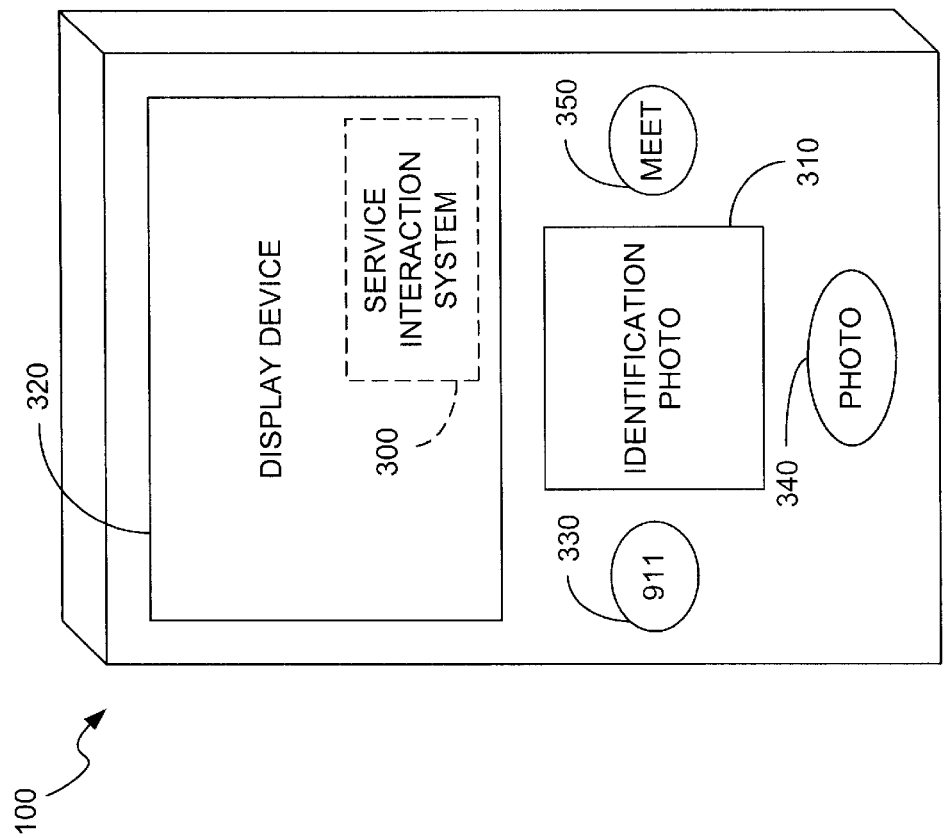
FIG. 3 is a schematic diagram depicting an embodiment of the identification device of FIG. 2.

An embodiment of identification device 100 is depicted schematically in FIG. 3. That embodiment of the identification device is configured much like a personal digital assistant (PDA), e.g., the device is portable and configured for hand-held use. As depicted in FIG. 3, identification device 100 includes an area 310 that is designated for displaying a likeness, e.g., a photograph, of the user. A display device 320 is provided for displaying information to the user. In some embodiments, the display device can display various functional icons (not shown) to the user. These icons can be actuated by the user, such as by screen-touch actuation, for example, to enable selected functionality of the services system.

Various actuators, e.g., actuators 330, 340 and 350, also are provided. In particular, actuator 330 can be configured to initiate emergency system functionality of the services system, actuator 340 can be configured to initiate photo system functionality of the services system, and actuator 350 can be configured to initiate meeting system functionality of the services system. These and other functions of the services system will be described in detail hereinafter. It should be noted that, in other embodiments, other numbers of actuators can be used.

The identification device of FIG. 3 incorporates a services interaction system 300. Services interaction system 300 is configured to facilitate interaction between the user and the services system. For instance, the services interaction system can be configured to receive one or more inputs from the services system. In response thereto, the services interaction system may provide information to the user. Additionally, the services interaction system can be configured to receive one or more inputs from the user and, in response thereto, may provide information to the services system.

Services interaction system 300 of the invention can be implemented in software, firmware, hardware, or a combination thereof. Preferably, services interaction system 300 is implemented in software as a program that is executable by a digital computer. An example of a computer that can implement services interaction system 300 is shown schematically in FIG. 4.

Generally, in terms of hardware architecture, computer 400 includes a processor 402, memory 404, and one or more input and/or output (I/O) devices 406 (or peripherals) that are communicatively coupled via a local interface 408. Local interface 408 can be, for example, one or more buses or other wired or wireless connections, as is known in the art. Local interface 408 can include additional elements, which are omitted for ease of description. These additional elements can be controllers, buffers (caches), drivers, repeaters, and/or receivers, for example. Further, the local interface may include address, control, and/or data connections to enable appropriate communications among the components of computer 400.

Processor 402 can be a hardware device configured to execute software that can be stored in memory 404. Processor 402 can be any custom made or commercially available processor, a central processing unit (CPU) or an auxiliary processor among several processors associated with the computer 400. Additionally, the processor can be a semiconductor-based microprocessor (in the form of a microchip), for example.

Memory 404 can include any combination of volatile memory elements (e.g., random access memory (RAM, such as DRAM, SRAM, etc.)) and/or nonvolatile memory elements (e.g., ROM, hard drive, tape, CDROM, etc.). Moreover, memory 404 can incorporate electronic, magnetic, optical, and/or other types of storage media. Note that memory 1104 can have a distributed architecture, where various components are situated remote from one another, but can be accessed by processor 402.

Figure 4:
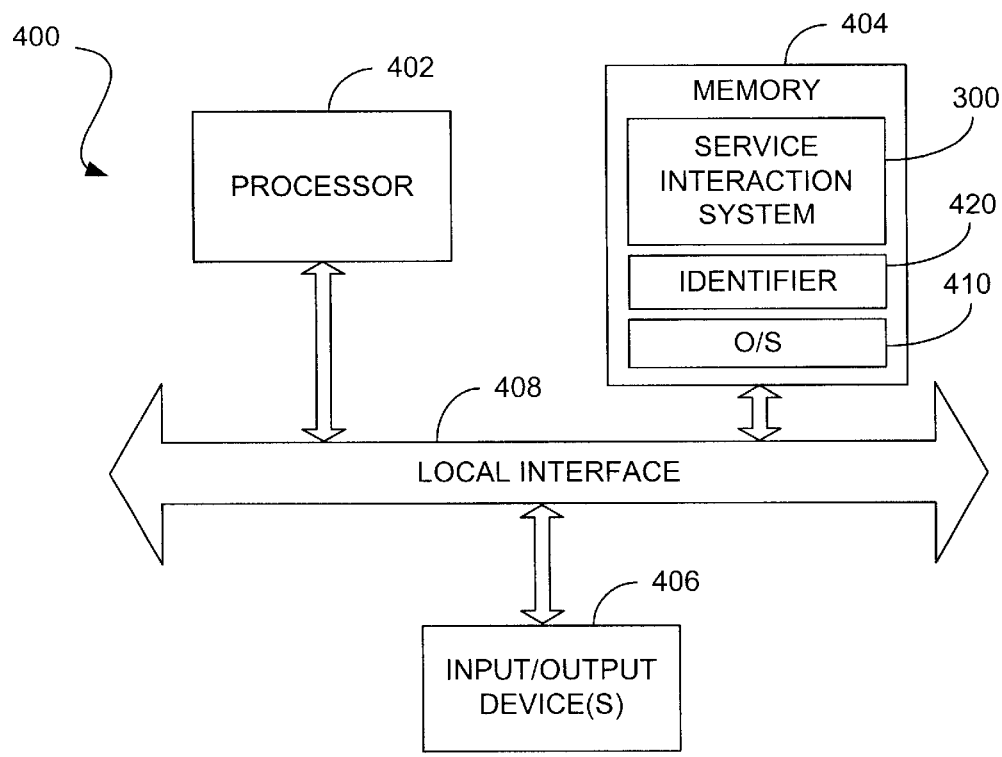
FIG. 4 is a schematic diagram depicting a computer or processor-based device that may be utilized to implement the service interaction system of FIG. 3.

The software in memory 404 can include one or more separate programs, each of which comprises an ordered listing of executable instructions for implementing logical functions. In the example of FIG. 4, the software in the memory 404 includes services interaction system 300, which may include an identifier 420 associated with the user of the identification device, and a suitable operating system (O/S) 410. The operating system 410 controls the execution of other computer programs, such as services interaction system 300. Operating system 410 also provides scheduling, input-output control, file and data management, memory management, and communication control and related services.

The I/O device(s) 406 can include input devices such as a keypad, for example. I/O device(s) 406 also can include output devices such as a display device (e.g., display device 320 of FIG. 3) or speaker, for example. I/O device(s) 406 may further include devices that are configured to communicate both inputs and outputs such as a touch screen display, for example.

When the computer 400 is in operation, processor 402 is configured to execute software stored within the memory 404, communicate data to and from the memory 404, and generally control operations of the computer 400. Services interaction system 300 and the O/S 410, in whole or in part, are read by the processor 402, perhaps buffered within processor 402, and then executed.

When services interaction system 300 is implemented in software, it should be noted that the control system can be stored on any computer readable medium for use by or in connection with any computer-related system or method. In the context of this document, a computer-readable medium is an electronic, magnetic, optical, or other physical device or means that can contain or store a computer program for use by or in connection with a computer-related system or method. Services interaction system 300 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

When implemented in hardware, services interaction system 300 can be implemented with any or a combination of various technologies. By way of example, the following technologies, which are each well known in the art, can be used: a discrete logic circuit(s) having logic gates for implementing logic functions upon data signals, an application specific integrated circuit (ASIC) having appropriate combinational logic gates, a programmable gate array(s) (PGA), and a field programmable gate array (FPGA).

Figure 5:
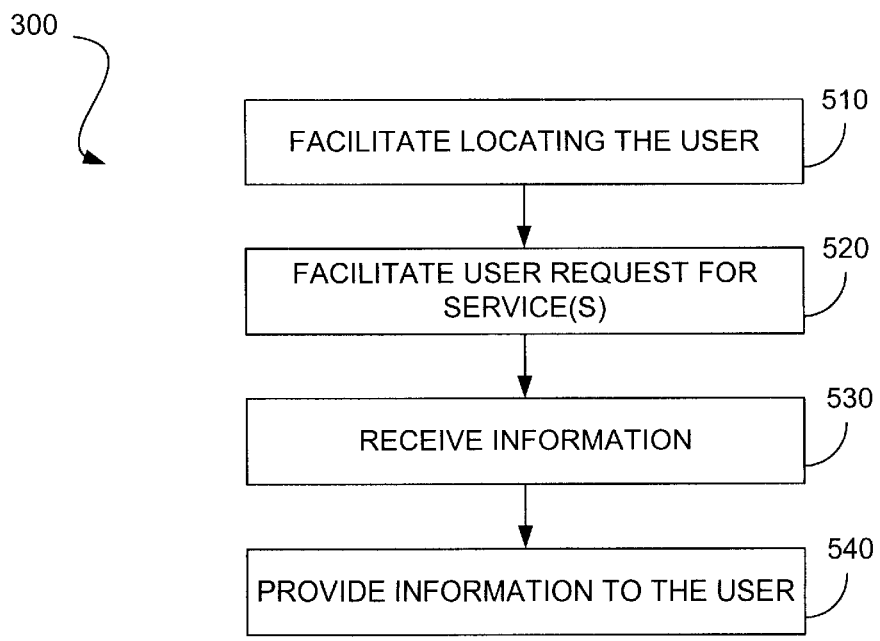
FIG. 5 is a flowchart depicting functionality of an embodiment of the services system of FIG. 4.

The flowchart of FIG. 5 depicts the functionality of an implementation of services interaction system 300. In this regard, each block of the flowchart represents a module segment or portion of code which comprises one or more executable instructions for implementing the specified logical function(s). It should also be noted that in some alternative implementations the functions noted in various blocks of FIG. 5, or any other of the accompanying flowcharts, may occur out of the order in which they are depicted. For example, two blocks shown in succession in FIG. 5 may, in fact, be executed substantially concurrently. In other embodiments, the blocks may sometimes be executed in the reverse order depending upon the functionality involved.

Referring now to the flowchart of FIG. 5, the functionality of the services interaction system or method 300 may be construed as beginning at block 510 where locating the user is facilitated. By way of example, the services interaction system may receive information provided to the identification device via the locator, e.g., a GPS receiver. In block 520, a request for services by the user is facilitated. More specifically, the services interaction system can receive an input from the user, with the input corresponding to a request for a particular service. In response to the user input, an appropriate signal and/or information can be provided to the services system by the identification device.

The services interaction system also can receive information, such as depicted in block 530. For example, the services interaction system can receive wait-time information corresponding to a particular activity of interest (described in detail hereinafter). Typically, such information would be compiled by the services system. In block 540, information is provided to the user. Thus, in the preceding example, at least some of the wait-time information maintained by the services system is provided to the user (block 540).

Services system 110 of the invention can be implemented in software, firmware, hardware, or a combination thereof. Preferably, services system 110 is implemented in software as an executable program. Services system 110 can be executed by a special or general purpose digital computer, such as a personal computer, workstation, minicomputer, or mainframe computer. Typically, the services system is implemented by a server that is configured to receive input and/or provide outputs to various devices, such as identification devices 100 (FIG. 1). An example of a computer that can implement services system 110 is shown schematically in FIG. 6.

Figure 6:
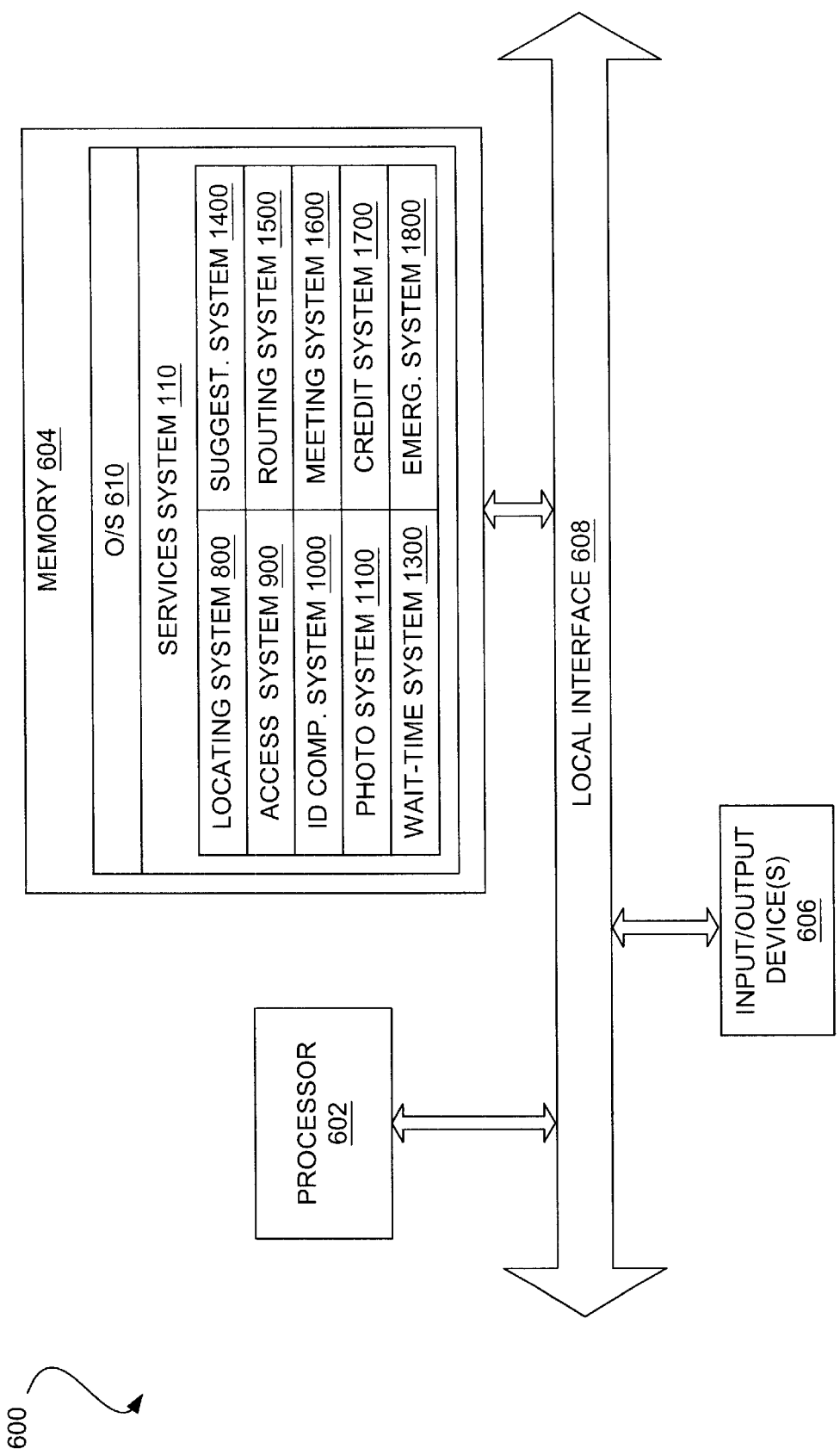
FIG. 6 is a schematic diagram depicting a computer or processor-based device that may be used to implement the services system of FIG. 1.

Generally, in terms of hardware architecture, computer 600 includes a processor 602, memory 604, and one or more input and/or output (I/O) devices 606 (or peripherals) that are communicatively coupled via a local interface 608. Software in memory 604 can include one or more separate programs, each of which comprises an ordered listing of executable instructions for implementing logical functions. In the example of FIG. 6, the software in the memory 604 includes services system 110 and a suitable operating system (O/S) 610. Services system 300 can include one or more of the following systems: locating system 800, access system 900, identification comparison system 1000, photo system 1100, wait-time system 1300, suggestion system 1400, routing system 1500, meeting system 1600, credit system 1700, and emergency response system 1800. Each of the aforementioned systems will be described in detail hereinafter.

Figure 7:
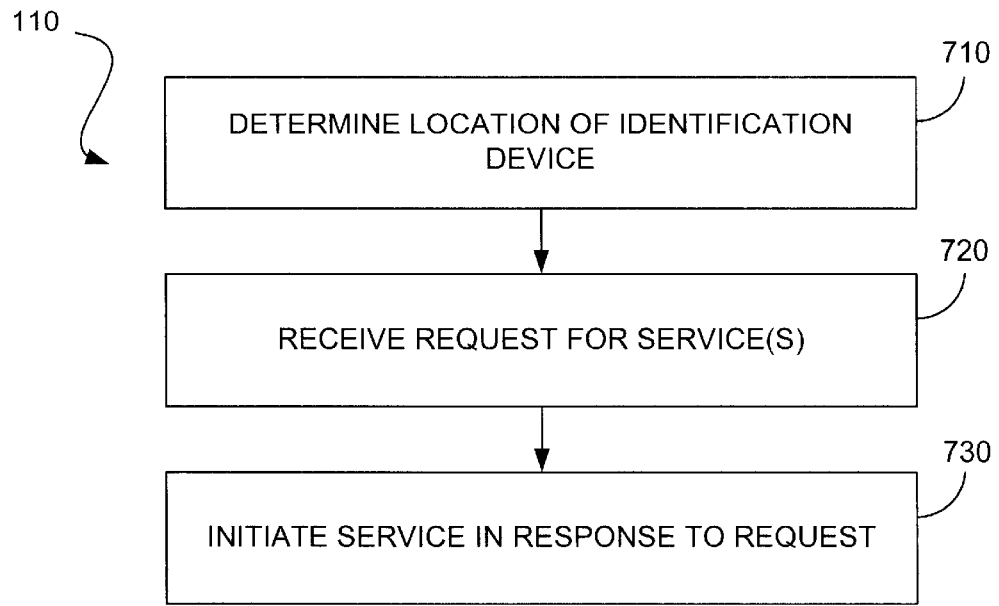
FIG. 7 is a flowchart depicting functionality of an embodiment of the services system of FIG. 6.

Referring now to FIG. 7, functionality of an embodiment of the services system will be described. As shown in FIG. 7, the services system can determine the location of one or more identification devices (block 710). Typically, such an identification device is associated with a user. Therefore, determining the location of the identification device also includes determining the location of the user associated with that device. In block 720, the services system is depicted as receiving a request for services. Typically, such a request is initiated by a user and is facilitated by an identification device. Thereafter, one or more services facilitated by the services system are initiated.

Figure 8:
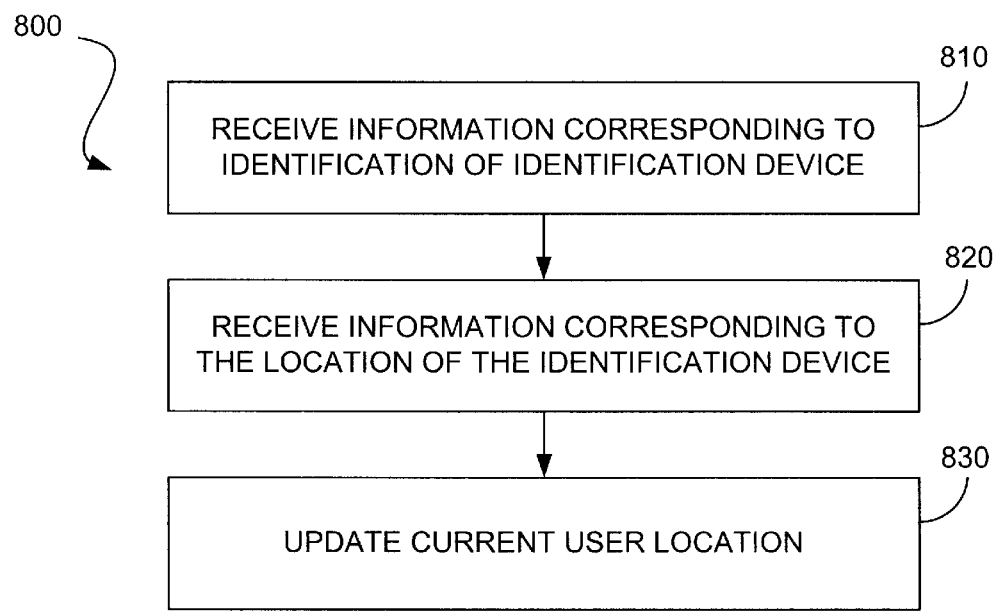
FIG. 8 is a flowchart depicting functionality of an embodiment of the locating system of FIG. 6.

Functionality of an embodiment of the locating system 800 is depicted in FIG. 8. Generally described, the locating system is adapted to determine the location of one or more identification devices associated with the services system. As shown in FIG. 8, locating system or method 800 preferably begins at block 810 where information corresponding to an identification device is received. For example, such information can include an identifier associated with the identification device. The identifier, and/or other information that can be used to identify the device, can be maintained by and/or be made accessible to the services system. As mentioned hereinbefore, an identification device typically is associated with a user or group of users. Thus, any information received that is associated with a particular identification device can be attributed to the appropriate user(s).

In block 820, information corresponding to the location of the identification device is received. In some embodiments, this can include information corresponding directly to the location of the device, i.e., information regarding the actual physical location of the identification device. In other embodiments, the information can facilitate locating the information device. For instance, the information could be provided as a signal, which can be tracked by the locating system. The locating system can then determine the location of the identification device based upon the relationship of the signal to one or more tracking stations.

Once the location of the identification device is determined, the current location of the user associated with the identification device can be updated (block 830), such as by replacing previously stored user location information with the location information most recently determined. Updating of the location of a user can be accomplished at various intervals and/or in association with various events. By way of example, user location information could be updated at a specific time increment, e.g., every 30 seconds and/or at occurrences of the user requesting a service of the services system, among others.

Figure 9:
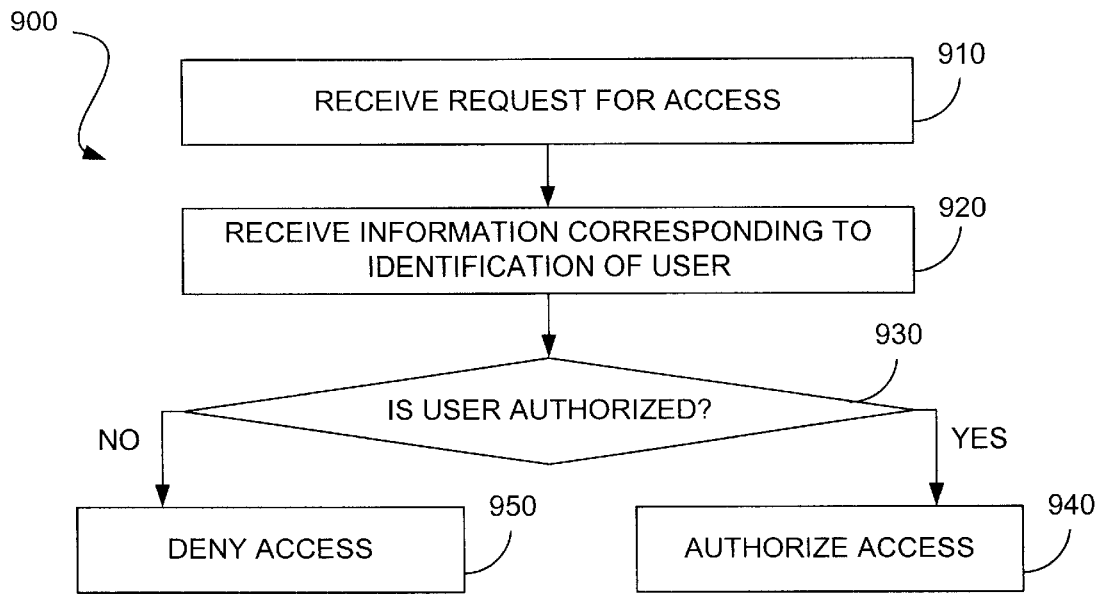
FIG. 9 is a flowchart depicting functionality of an embodiment of the access system of FIG. 6.

Functionality of an embodiment of the access system 900 is depicted in FIG. 9. The access system can be used by the services system to determine whether a user is to be authorized access to an area, activity, attraction, etc. As shown in FIG. 9, access system or method 900 preferably begins at block 910 where a request for access is received. Such a request can be directly associated with an area, activity, and/or attraction, such as by the request being provided to the access system from a communication device corresponding to the area, activity, and/or attraction. By way of example, a card reader could be provided at an attraction. The user desiring access to the attraction could be prompted to engage the card reader with the identification device assigned to the user so that information corresponding to the identification of the user can be determined (in this example, the identification device includes bar code information). In such an embodiment, the request for access may be attributed to a particular user and attraction.

In other embodiments, the system could assume that the user is requesting access based upon the user's current location. In these embodiments, the access system could use information pertaining to the user's location stored by the services system and/or could prompt the locating system to determine the current location of the user. Regardless of the particular methodology used, once the user's location is determined, the system could attempt to attribute the request for access to the area, activity, and/or attraction closest to the user, for example.

In block 920, information corresponding to the identification of a user is received. For instance, information corresponding to the identification of a user can include the identifier associated with an identification device. As described in relation to the locating system, the identifier associated with the identification device can be used to identify the user of that device.

In block 930, user access is determined based upon the identification of the user. More specifically, some embodiments of the services system store information pertaining to those attributes of a user that should be exhibited by the user before access is to be authorized. For instance, if the facility implementing the services system operates a ride, e.g., a roller coaster, that requires a user to be at least seven (7) years old and a height of at least forty eight (48) inches, the access system could compare the attributes of the identified user to the attributes required for access. Information pertaining to user attributes can be obtained from the user at various times and/or places. For example, the user could be required to provide such information to the services system prior to being assigned an identification device. Alternatively, the user could provide the information relevant to obtaining access to a particular attraction when the user requests access to the attraction.

If it is determined in block 930 that the user possesses the required attributes, the process preferably proceeds to block 940 where the access is authorized. If, however, it is determined that authorization is not to be granted, the process can proceed to block 950 where access is denied.

Figure 10:
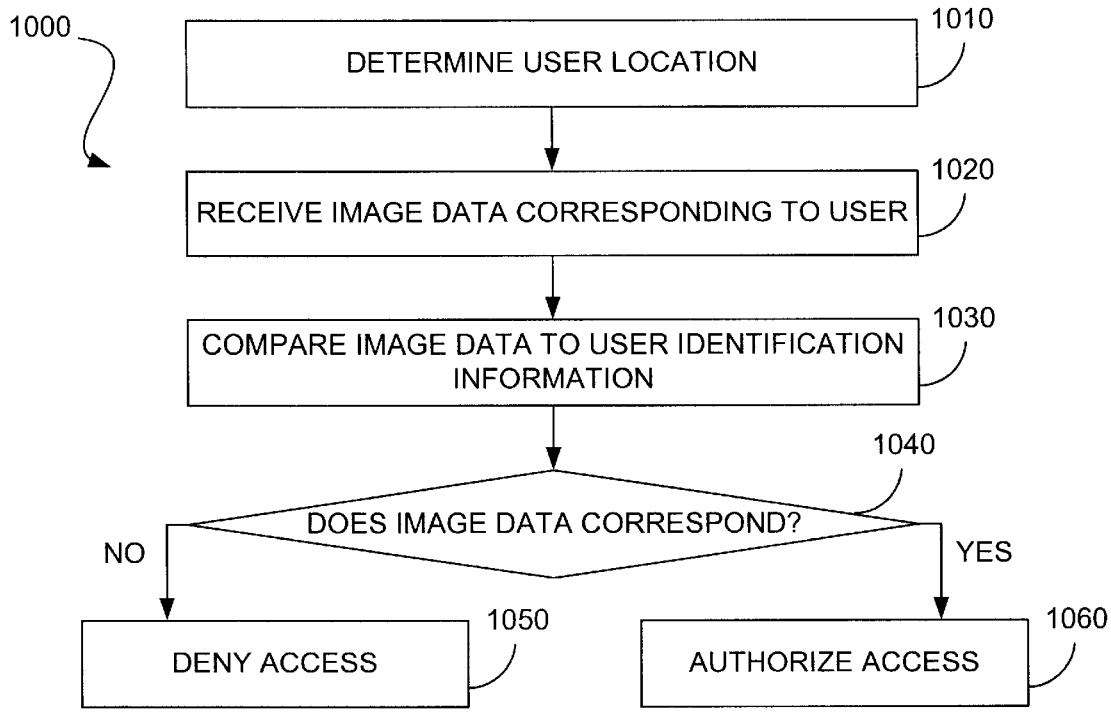
FIG. 10 is a flowchart depicting functionality of an embodiment of the identification comparison system of FIG. 6.

Functionality of an embodiment of the identification comparison system 1000 is depicted in FIG. 10. The identification comparison system 1000 can be used by the services system to determine whether the user of an identification device is the user assigned to that identification device. In this regard, an embodiment of the identification comparison system or method 1000 preferably begins at block 1010 where the location of a user currently in possession of an identification device is determined. In block 1020, image data corresponding to that user is received. The image data can be acquired by prompting an image-capturing device, e.g., an image-capturing device located in the vicinity of the user, to capture image data corresponding to the location of the user. Thereafter, such as depicted in block 1030, image data received is compared to information associated with the identification of the user assigned to the identification device. Comparing of the image data and the information associated with the identification of the user can be accomplished by one or more of various image-comparison algorithms, or can be accomplished manually, such as by displaying the information to an operator for review.

In block 1040, a determination then can be made as to whether the image data received corresponds to the user information. If the image data does not correspond, the identification device can be disabled, such as by preventing the device from being able to actuate various functions of the services system.

In other embodiments, the identification comparison system can be used to determine whether the user should be authorized access. In these embodiments, if it is determined that the image data corresponds to the user information, access may be authorized, such as depicted in block 1060. If, however, the image data does not correspond with the user information, access can be denied such as depicted in block 1050.

Figure 11:
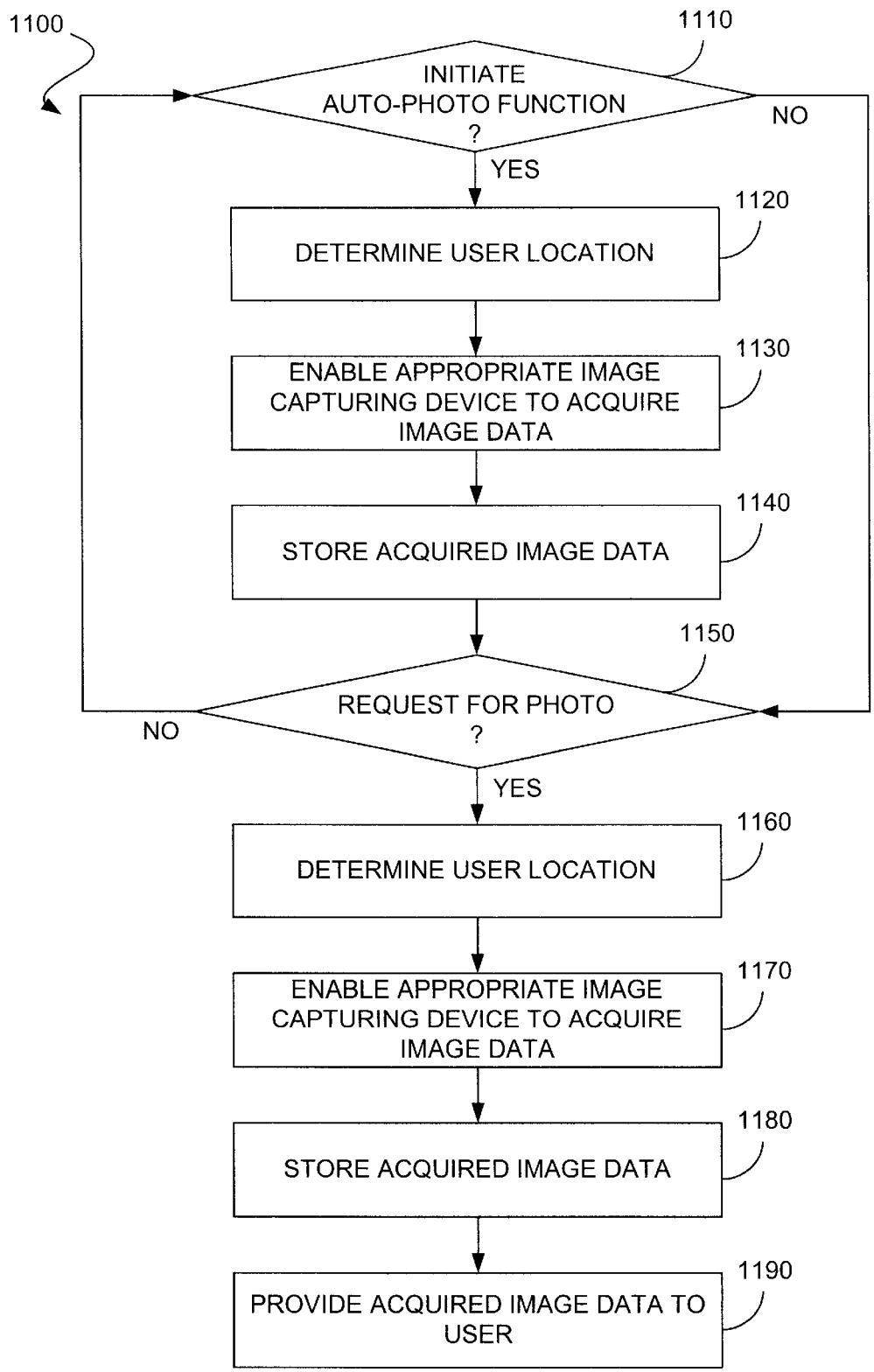
FIG. 11 is a flowchart depicting functionality of an embodiment of the photo system of FIG. 6.

Functionality of an embodiment of the photo system 1100 is depicted in FIG. 11. The photo system can be used by the services system to acquire image data. For instance, the image data can be used for various purposes, such as for general surveillance, security, etc. As mentioned hereinbefore, the image comparison system uses image data. The image data used by the image comparison system may be acquired by the photo system. Additionally, the image data can be provided to a user, such as in the form of a photograph or novelty item exhibiting the image data.

Referring now to FIG. 11, the photo system or method 1100 preferably begins at block 1110 where a determination is made as to whether auto-photo functionality is to be initiated. If it is determined in block 1110 that auto-photo functionality is to be initiated, the process preferably proceeds to block 1120 where the location of a user is determined. This can be accomplished by the locating system, for example. In block 1130, an appropriate image-capturing device can be enabled to acquire image data. For instance, the acquisition of image data may occur when the location of the user corresponds to a pre-selected location and/or can occur at a predetermined time interval. By way of example, an image-capturing device could be positioned to acquire image data corresponding to a predetermined portion of a roller coaster ride. Thus, when the location of the user corresponds to that predetermined location, the auto-photo function initiates acquisition of image data corresponding to that location. In block 1140, acquired image data is stored.

The photo system also can acquire image data upon request. For example, in block 1150, a determination is made as to whether a request for photo has been received. The process also can proceed to block 1150 if auto-photo functionality is not desired. If it is determined that a request for photo has been received, the location of the user initiating the request can be determined, such as depicted in block 1160. If, however, a request for photo has not been received, the process may return to block 1110 and proceed as described hereinbefore. In block 1170, an appropriate image-capturing device may be enabled to acquire image data corresponding to the user. More specifically, the image-capturing device is enabled to acquire image data corresponding to the location of the user. Thereafter, such as depicted in block 1180, acquired image data can be stored.

In some embodiments, acquired image data can be provided to the user (block 1190). For instance, the user can be provided with access to an appropriate display device, such as a display device provided by a kiosk and/or an identification device, so that acquired image data may be viewed by the user.

Figure 12:
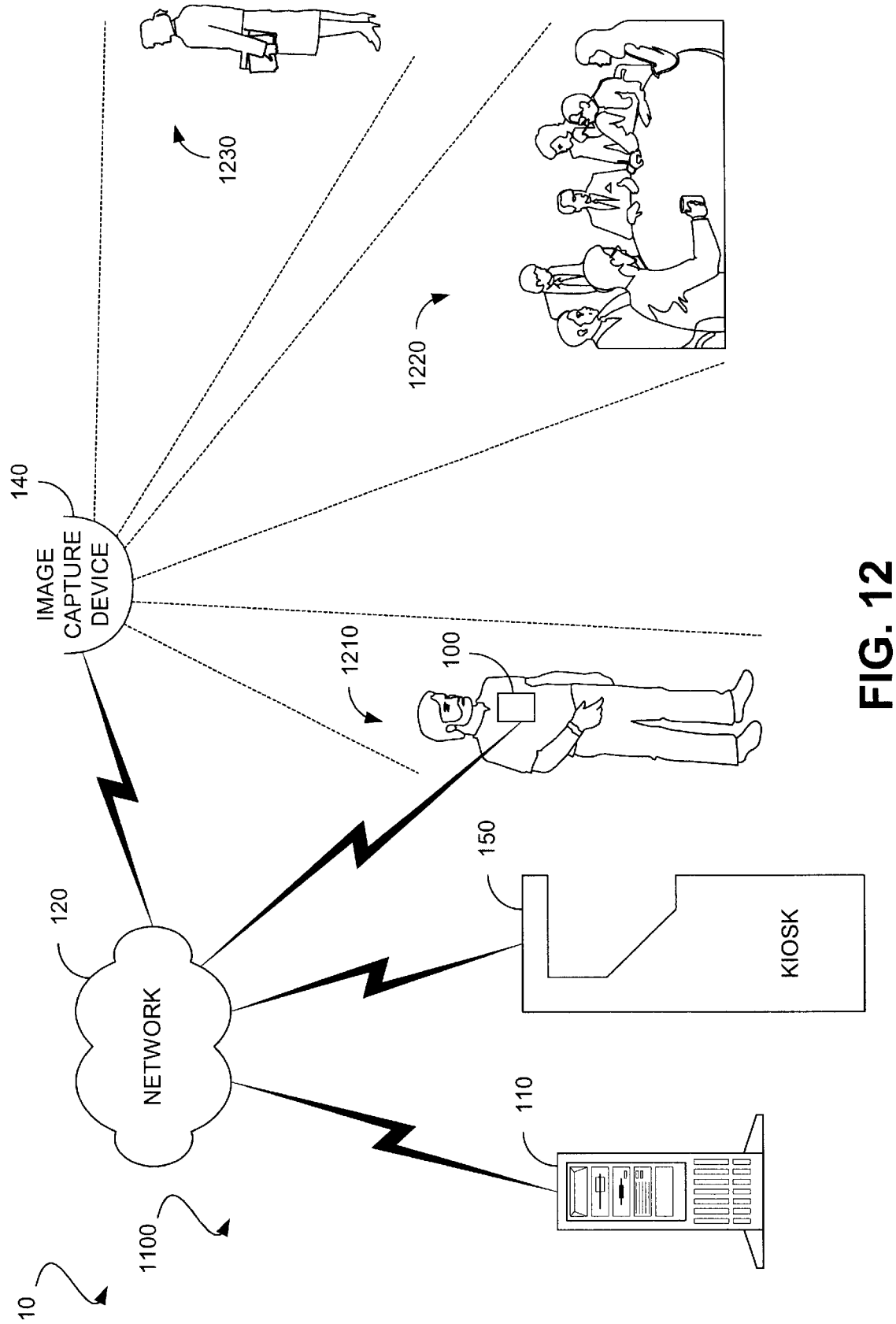
FIG. 12 is a schematic diagram depicting representative operation of the photo system of FIG. 6.

An embodiment of the photo system is schematically depicted in FIG. 12. As shown therein, an image-capturing device 140 is provided that is configured to communicate with services system 110 via network 120. Preferably, image-capturing device 140 is configured to acquire image data at one or more of various locations and, in some embodiments, can simultaneously acquire image data at more than one location. In FIG. 12, image-capturing device 140 is configured to simultaneously acquire image data at three locations, e.g., locations 1210, 1220, and 1230.

As mentioned hereinbefore, image-capturing devices of the photo system can be enabled to acquire image data automatically and/or in response to a request. By way of example, automatic acquisition of image data can be prompted by detection of an identification device 100 being in the vicinity of location 1210. Once so positioned, the image-capturing device could be prompted to capture an image corresponding to location 1210. Alternatively, the user could actuate the request for a photo so that the image-capturing device acquires image data. Image data then may be provided to the user for viewing, such as via a display device of the identification device 100 and/or a display device of a kiosk 150, for example.

Image-capturing device 140 also may be used for general surveillance of a facility. In these embodiments, the image-capturing device may be adapted to provide real-time images and/or still images, among others, of one or more locations. It should be noted that in these embodiments, security monitoring and entertainment functionality, e.g., providing images for users, can be provided by the same image-capturing device.

Figure 13:
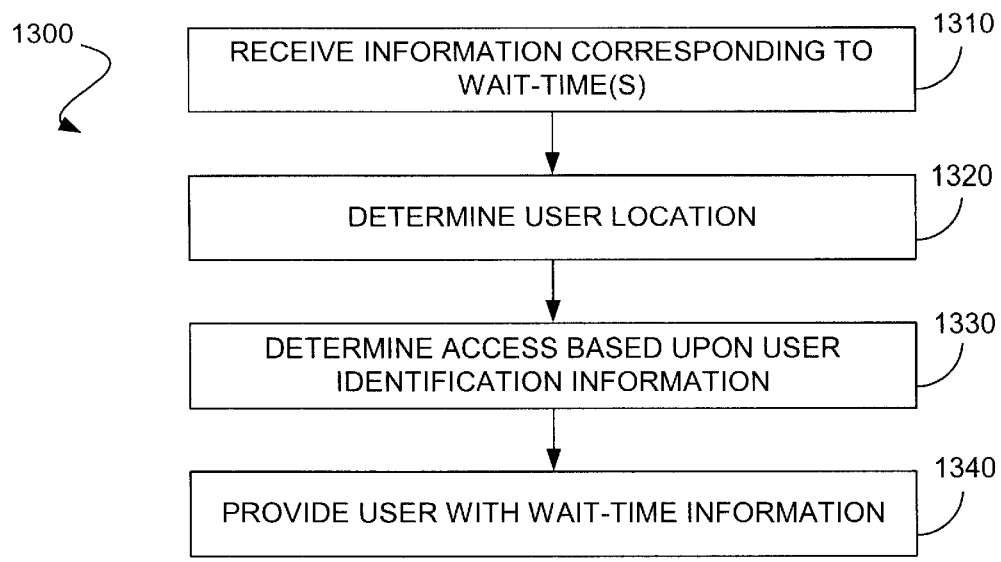
FIG. 13 is a flowchart depicting functionality of an embodiment of the wait-time system of FIG. 6.

Functionality of an embodiment of the wait-time system 1300 is depicted in FIG. 13. Generally described, the wait-time system is adapted to determine wait-times of various attractions. In some embodiments, this information can then be used to direct users to various other attractions, for example. In this regard, the embodiment of the wait-time system or method 1300 preferably begins at block 1310 where information corresponding to one or more wait-times is received. For example, such information can include the approximate current wait-time before being able to ride a particular amusement. The information can be stored by the services system and updated as appropriate.

By way of example, in block 1320, the location of a user is determined. In block 1330, a determination may be made pertaining to which attractions the user may be authorized access. Based upon the user's current location and/or the user's potential for being granted access, relevant wait-time information can be provided to the user. In other embodiments, the user can be provided with wait-time information upon request and/or in disregard of current location and/or potential access.

Figure 14:
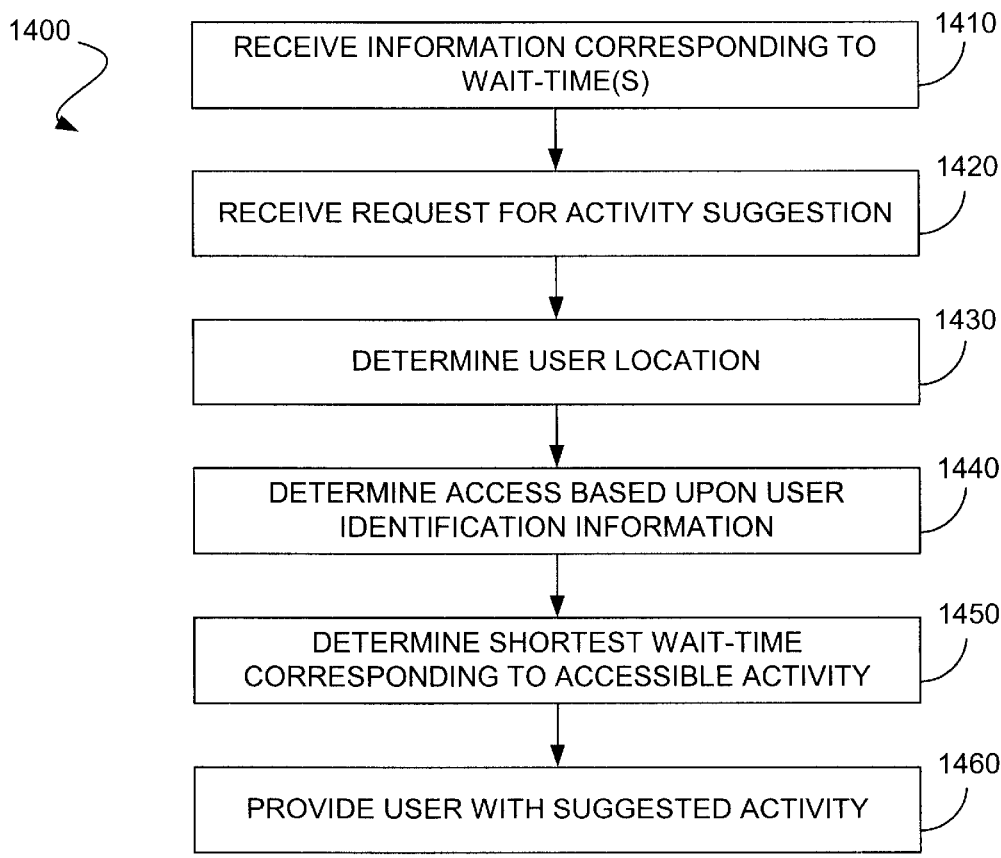
FIG. 14 is a flowchart depicting functionality of an embodiment of the suggestion system of FIG. 6.

Functionality of an embodiment of the suggestion system 1400 is depicted in FIG. 14. Embodiments of the suggestion system can be adapted to provide information to users based on one or more of various facility conditions, such as wait-times, locations of the users, user access, etc. In this regard, an embodiment of the suggestion system or method 1400 may be construed as beginning at block 1410, where information corresponding to one or more wait-times is received. In block 1420, a request for an activity suggestion is received. For example, such a request can be facilitated by actuating a corresponding component of an identification device or kiosk, among others. User location is determined and access is determined based upon user identification information, such as depicted in blocks 1430 and 1440, respectively. In some embodiments, the shortest wait-times corresponding to activities to which the user has access is determined (block 1450). In block 1460, the user can be provided with a suggested activity, such as that activity having the shortest wait-time to which the user should be granted access. In other embodiments, the suggested activity could merely be based on user location or wait-times.

Figure 15:
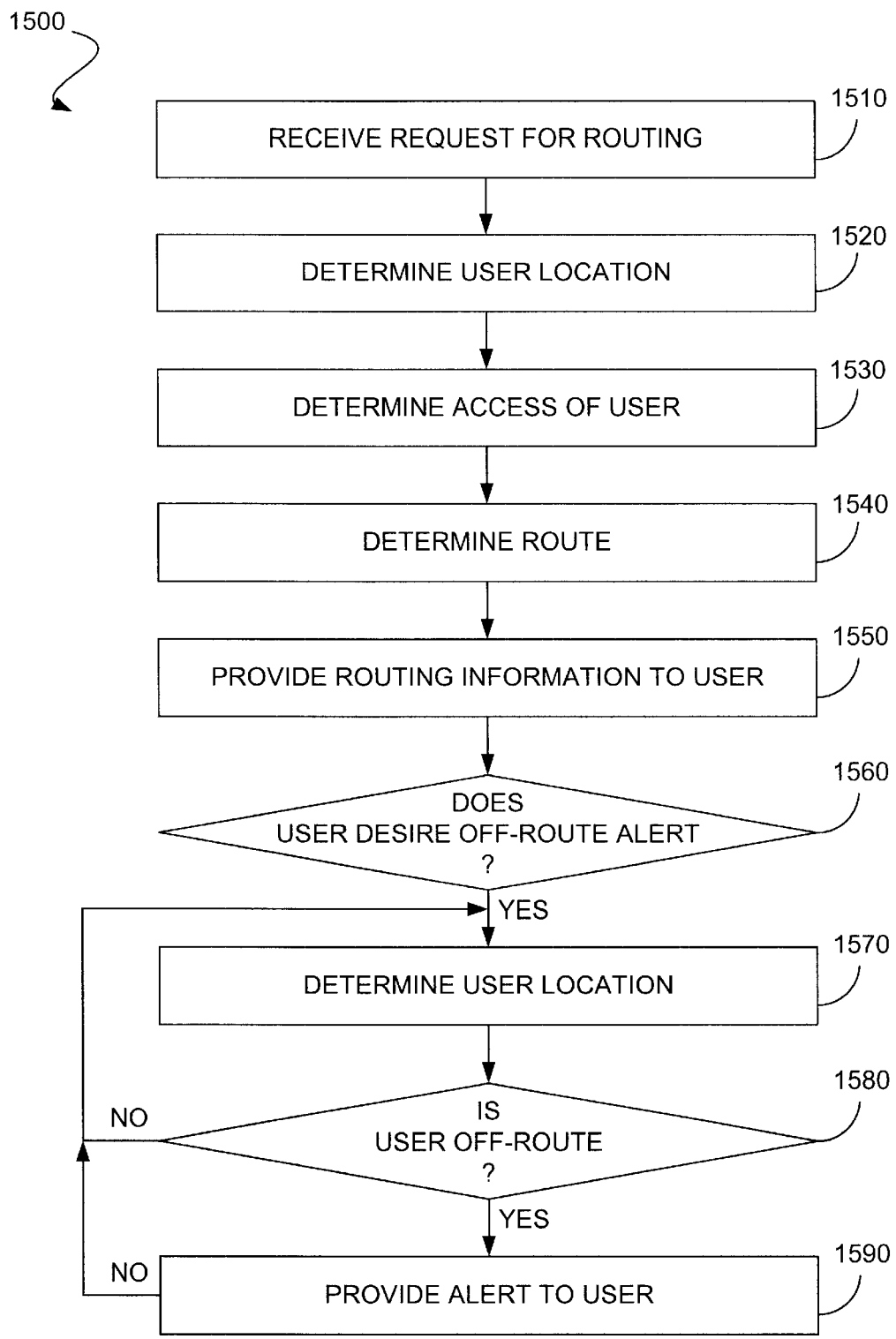
FIG. 15 is a flowchart depicting functionality of an embodiment of the routing system of FIG. 6.

Embodiments of the routing system 1500 can be adapted to provide a user with information that directs the user to a particular location or attraction, for example. Functionality of an embodiment of the routing system 1500 is depicted in FIG. 15. In this regard, the routing system or method 1500 may be construed as beginning at block 1510 where a request for routing is received. Such a request preferably includes the intended destination of the user. The location and potential access of the user are determined in blocks 1520 and 1530, respectively. In block 1540, a suitable route for the user is determined and the routing information is provided to the user in block 1550.

In some embodiments, the process may proceed to block 1560, where a determination is made as to whether the user desires an off-route alert. Such an alert can be provided in numerous configurations, such as an aural and/or visual alert provided by the identification device. If it is determined that the user desires an off-route alert, the process may proceed to block 1570 where user location is determined. In block 1580, a determination then is made as to whether the user is off the provided route. If it is determined in block 1580 that the user has strayed off the route, the process may proceed to block 1590 where an alert is provided to the user. If, however, the user is not off route, the process may return to block 1570 so that user location can once again be determined and compared to the established route.

In some embodiments, the routing system can be used to receive status information on another user. In a representative embodiment, a route may be established for one user, e.g., a child, and another user, e.g., a parent of the child, may be provided with status information pertaining to advancement of the child along the established route. For instance, if the child strays from the pre-established route, the parent may be provided with an alert indicating that the child is not proceeding along the route as directed.

Figure 16:
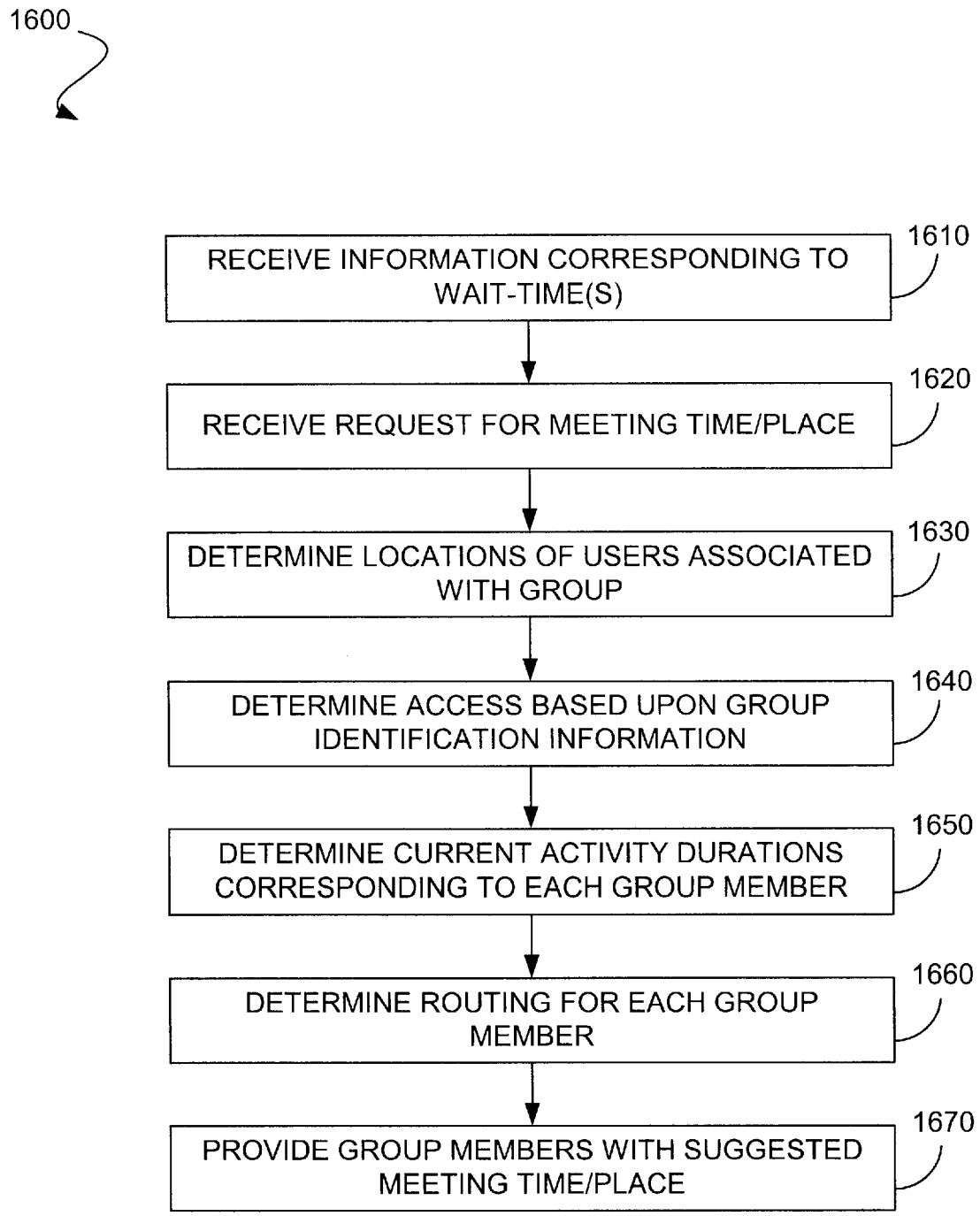
FIG. 16 is a flowchart depicting functionality of an embodiment of the meeting system of FIG. 6.

Reference will now be made to FIG. 16, which depicts functionality of an embodiment of the meeting system 1600. Generally, the meeting system can be configured to establish a meeting time and/or place for a group of users. In this regard, meeting system or method 1600 may be construed as beginning in block 1610 where information corresponding to one or more wait-times is received. In block 1620, a request for a meeting time and/or place is received. In some embodiments, the user can identify a particular location and/or meeting time, whereas, in other embodiments, the selection of a meeting time and/or place is facilitated by the meeting system.

In block 1630, locations of users associated with the group desiring the meeting time and/or place is determined. Proceeding to block 1640, access can then be determined based upon the identified group members. In block 1650, current activity durations corresponding to each group member can be determined. For instance, if the location of a particular user corresponds to particular activity, the meeting system could determine the approximate end time for that activity. The meeting time could then be designated at a time following completion of the identified activity. Routing for each group member can be determined, such as depicted in 1660. In block 1670, group members can be provided with a suggested meeting time and/or place.

Figure 17:
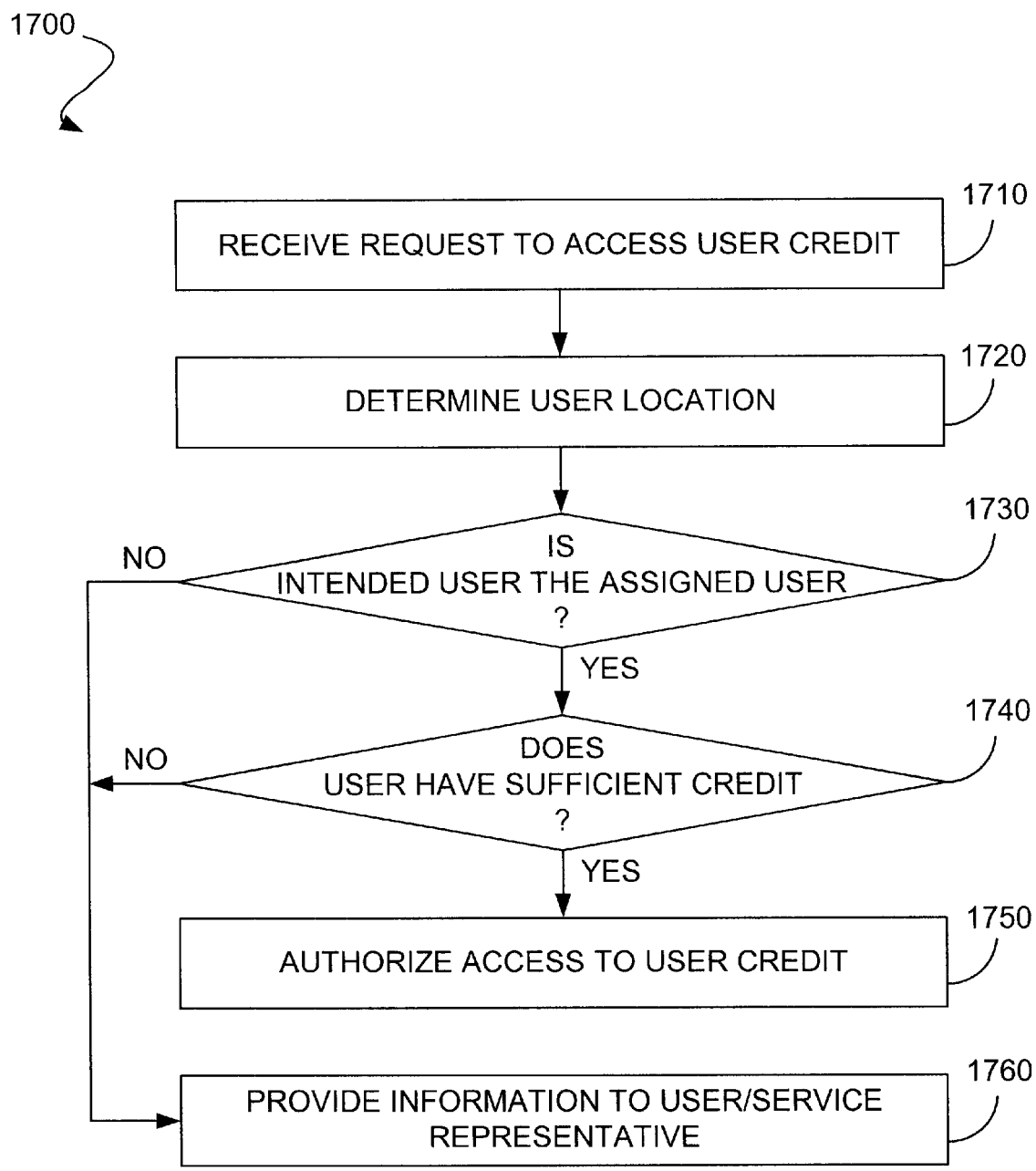
FIG. 17 is a flowchart depicting functionality of an embodiment of the credit system of FIG. 6.

Referring now to FIG. 17, an embodiment of the credit system 1700 will be described in greater detail. The embodiment of the credit system depicted in FIG. 17 is adapted to facilitate relatively secure use of monetary credit by a user. Preferably, initiation of a request to access credit is facilitated by an identification device. In this regard, the credit system or method 1700 may be construed as beginning in block 1710 where a request to access user credit is received. In block 1720, the location of the user requesting access is determined. Thereafter, such as depicted in block 1730, a determination is made as to whether the intended user is the user assigned to the identification device. Such a determination may be facilitated by the identification comparison system. If the intended user of the credit is the user assigned to the identification device, the process may proceed to block 1740 where a determination is made as to whether the user has sufficient credit for conducting the requested transaction. If it is determined that the user has sufficient credit, the process may proceed to block 1750 where access to the user credit is authorized. If, however, it is determined that the intended user is not the designated user and/or the user does not have sufficient credit, the process may proceed to block 1760. In block 1760, information can be provided to the user and/or a service representative informing the intended user that a potential problem exists.

Embodiments of the services system also can include an emergency response system 1800 (FIG. 6). The emergency response system can be actuated by an identification device, such as by actuating a button, e.g., button 330 of FIG. 3. In response to actuation, the identification device can provide information to the emergency response system that enables the user to be located. Personnel can then be directed to the user to provide assistance as necessary.

What is claimed is:

1. An identification service system for providing information to a user, said identification service system comprising:

a first identification device having a locator and a transmitter, said locator being configured to facilitate determining a location of said first identification device, said first identification device being further configured to store identification information, said identification information corresponding to a first user, said transmitter being configured to transmit information associated with the location of said first identification device and identification information corresponding to the first user to a services system such that the services system provides information to the first user via said first identification device based, at least in part, on the location of said first identification device; and a services system configured to communicate with said first identification device, said services system being further configured to receive information associated with the location of said first identification device and identification information corresponding to the first user such that, in response thereto, said services system provides information to the first user based, at least in part, on the location of said first identification device;

wherein said services system stores information corresponding to the first user, and wherein said services system includes an access system, said access system being configured to receive a request for access associated with the first user, said access system being configured to compare the information corresponding to the first user to predetermined access requirements corresponding to the request for access such that, if the first user possesses the predetermined access requirements, the access system authorizes access to the first user.

2. An identification service system for providing information to a user, said identification service system comprising:

a first identification device having a locator and a transmitter, said locator being configured to facilitate determining a location of said first identification device, said first identification device being further configured to store identification information, said identification information corresponding to a first user, said transmitter being configured to transmit information associated with the location of said first identification device and identification information corresponding to the first user to a services system such that the services system provides information to the first user via said first identification device based, at least in part, on the location of said first identification device; and a services system configured to communicate with said first identification device, said services system being further configured to receive information associated with the location of said first identification device and identification information corresponding to the first user such that, in response thereto, said services system provides information to the first user based, at least in part, on the location of said first identification device;

wherein said services system stores image data corresponding to the first user, and wherein said services system includes an identification comparison system, said identification comparison system being configured to receive image data corresponding to the first user, compare said image data to said image data stored by said services system, and determine whether said image data corresponds to said image data stored by said services system.

3. An identification service system for providing information to a user, said identification service system comprising:

a first identification device having a locator and a transmitter, said locator being configured to facilitate determining a location of said first identification device, said first identification device being further configured to store identification information, said identification information corresponding to a first user, said transmitter being configured to transmit information associated with the location of said first identification device and identification information corresponding to the first user to a services system such that the services system provides information to the first user via said first identification device based, at least in part, on the location of said first identification device; and a services system configured to communicate with said first identification device, said services system being further configured to receive information associated with the location of said first identification device and identification information corresponding to the first user such that, in response thereto, said services system provides information to the first user based, at least in part, on the location of said first identification device;

wherein said services system includes a wait-time system, said wait-time system being configured to receive information corresponding to a wait-time of a first attraction and provide the information corresponding to the wait-time of the first attraction to the first user via said first identification device.

4. An identification service system for providing information to a user, said identification service system comprising:

a first identification device having a locator and a transmitter, said locator being configured to facilitate determining a location of said first identification device, said first identification device being further configured to store identification information, said identification information corresponding to a first user, said transmitter being configured to transmit information associated with the location of said first identification device and identification information corresponding to the first user to a services system such that the services system provides information to the first user via said first identification device based, at least in part, on the location of said first identification device; and a services system configured to communicate with said first identification device, said services system being further configured to receive information associated with the location of said first identification device and identification information corresponding to the first user such that, in response thereto, said services system provides information to the first user based, at least in part, on the location of said first identification device;

wherein said services system includes a suggestion system, said suggestion system being configured to receive information corresponding to a wait-time of a first attraction and a wait-time of a second attraction, the wait-time of the first attraction being longer than the wait-time of the second attraction, receive a request for a suggestion from the first user, and in response to said request, provide information via said first identification device to the first user, the information directing the first user to the second attraction.

5. An identification service system for providing information to a user, said identification service system comprising:

a first identification device having a locator and a transmitter, said locator being configured to facilitate determining a location of said first identification device, said first identification device being further configured to store identification information, said identification information corresponding to a first user, said transmitter being configured to transmit information associated with the location of said first identification device and identification information corresponding to the first user to a services system such that the services system provides information to the first user via said first identification device based, at least in part, on the location of said first identification device; and a services system configured to communicate with said first identification device, said services system being further configured to receive information associated with the location of said first identification device and identification information corresponding to the first user such that, in response thereto, said services system provides information to the first user based, at least in part, on the location of said first identification device;

wherein said services system stores information regarding a second user associated with the first user, the second user having a second identification device, and wherein said services system includes a meeting system, said meeting system being configured to receive a request for a proposed meeting location from the first user and, in response thereto, determine locations of the first user and the second user, determine access of the first user and the second user, and provide the first user and the second user with information corresponding to the proposed meeting location via the first identification device and second identification device, respectively, the proposed meeting location being based, at least in part, on access of the first user and the second user.

6. The identification service system of claim 5, wherein said meeting system is configured to receive a proposed meeting time from the first user and, in response thereto, determine the proposed meeting location based, at least in part, on wait-times associated with attractions being undertaken by the first user and the second user and travel times associated with the first user and the second user reaching the proposed meeting location.

* * * * *